US009684294B2

(12) United States Patent
Ehtemam-Haghighi et al.

(10) Patent No.: US 9,684,294 B2
(45) Date of Patent: Jun. 20, 2017

(54) MULTI-CORE PROCESSOR FOR OPTIMIZED POWER CONSUMPTION IN A SECURITY AND HOME AUTOMATION SYSTEM

(71) Applicant: Tyco Safety Products Canada, Ltd., Concord (CA)

(72) Inventors: Omid Ehtemam-Haghighi, Toronto (CA); Shuping Lu, Richmond Hill (CA); Hector Perez, Markham (CA)

(73) Assignee: TYCO SAFETY PRODUCTS CANADA LTD., Concord, Ontario (CA)

( * ) Notice: Subject to any disclaimer, the term of this patent is extended or adjusted under 35 U.S.C. 154(b) by 161 days.

(21) Appl. No.: 14/593,210

(22) Filed: Jan. 9, 2015

(65) Prior Publication Data
US 2016/0202673 A1 Jul. 14, 2016

(51) Int. Cl.
*G06F 1/00* (2006.01)
*G05B 15/02* (2006.01)
*G06F 1/26* (2006.01)
*G06F 1/32* (2006.01)
*G06F 1/30* (2006.01)

(52) U.S. Cl.
CPC ...... *G05B 15/02* (2013.01); *G05B 2219/2642* (2013.01); *G06F 1/26* (2013.01); *G06F 1/263* (2013.01); *G06F 1/30* (2013.01); *G06F 1/32* (2013.01); *G06F 1/3203* (2013.01); *G06F 1/3212* (2013.01); *G06F 1/3234* (2013.01); *G06F 1/3287* (2013.01); *G06F 1/3293* (2013.01); *Y02P 80/114* (2015.11)

(58) Field of Classification Search
CPC ........ G06F 1/3203; G06F 1/3287; G06F 1/26; G06F 1/30; G06F 1/32; G06F 1/3234; G06F 1/263; G06F 1/3212; G06F 1/3293; G05B 15/02
See application file for complete search history.

(56) References Cited

U.S. PATENT DOCUMENTS

| 8,762,692 | B2 * | 6/2014 | Schuchman | G06F 1/3203 713/323 |
| 2005/0132239 | A1 * | 6/2005 | Athas | G06F 1/3203 713/300 |
| 2005/0154931 | A1 * | 7/2005 | Oh | G06F 1/3203 713/300 |
| 2008/0074542 | A1 * | 3/2008 | Cheng | G10L 19/005 348/512 |
| 2008/0184042 | A1 * | 7/2008 | Parks | G06F 1/3203 713/300 |

(Continued)

Primary Examiner — Xuxing Chen

(57) ABSTRACT

Techniques for using a multi-core processor for optimizing power consumption in a security and home automation system are described. The security and home automation system may include a multi-core processor having a first core and a second core. The first core may be partitioned from the second core to form an asymmetric multi-core processor. The first core is a master core assigned to execute a real time operating system (RTOS) and configured to periodically transition between a partial sleep state and an awake state during a power shortage condition. The second core is a slave core assigned to execute a standard operating system (OS) and configured to enter a deep sleep state during the power shortage condition.

20 Claims, 7 Drawing Sheets

(56) References Cited

U.S. PATENT DOCUMENTS

| | | | | |
|---|---|---|---|---|
| 2008/0244289 A1* | 10/2008 | LeProwse | ............... | G06F 9/441 |
| | | | | 713/320 |
| 2013/0061237 A1* | 3/2013 | Zaarur | ................. | G06F 9/4856 |
| | | | | 718/105 |
| 2016/0147280 A1* | 5/2016 | Thomas | ................ | G06F 1/3234 |
| | | | | 713/320 |

* cited by examiner

MULTI-CORE PROCESSOR FOR OPTIMIZED POWER CONSUMPTION IN A SECURITY AND HOME AUTOMATION SYSTEM

FIELD OF THE DISCLOSURE

Embodiments of the present disclosure relate generally to security and home automation systems, and more particularly to using a multi-core processor for optimized power consumption in a security and home automation system.

BACKGROUND OF THE DISCLOSURE

In today's society, security systems are commonly employed for detecting various alarm conditions, such as smoke, fire, intrusion, life safety, and the like. Home automation systems are also commonly employed for enabling automated control of various electronic devices and appliances.

Such security and home automation systems typically include numerous computers, video monitors, cameras, detectors, audio devices, sensors and/or other electrical components. In order for security and home automation systems to be effective, a continual source of power is required to maintain reliable operation. Any loss of power to these security and home automation systems may render it difficult to accurately send and receive critical data to and from components of the security and home automation systems. For example, if a power outage or power shortage occurs, components of the security and home automation systems may go offline and an alarm condition may resultantly go undetected. Accordingly, a need exists for an improved security and home automation system that optimizes power management in the event of a power outage or a power shortage condition.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In general, various embodiments of the present disclosure provide a system for optimizing power consumption in a security and home automation system using a multi-core processor. Such a system may include a multi-core processor having a first core and a second core, the first core partitioned from the second core to form an asymmetric multi-core processor. The first core is a master core assigned to execute a real time operating system (RTOS) and configured to periodically transition between a partial sleep state and an awake state during a power shortage condition. The second core is a slave core assigned to execute a full-blown operating system (OS) and configured to enter a deep sleep state during the power shortage condition.

An exemplary computer-implemented method for optimizing power consumption in a security and home automation system using a multi-core processor with various embodiments of the present disclosure may include a non-transitory computer-readable storage medium having instructions that perform the steps of partitioning a first core from a second core in a multi-core processor to form an asymmetric multi-core processor during bootloading stage, the first core is a master core executing a RTOS and the second core is slave core executing a full-blown OS, and periodically transitioning the first core between a partial sleep state and an awake state during a power shortage condition, and placing the second core in a deep sleep state during the power shortage condition.

Various embodiments of the present disclosure may also provide a system for optimizing power consumption in a security and home automation system using a multi-core processor. Such a system may include a multi-core processor having a first core and a second core. The first core may be partitioned from the second core to form an asymmetric multi-core processor. The first core may be a master core assigned to execute a RTOS and configured to periodically transition between a partial sleep state and an awake state during a power shortage condition. The second core may be a slave core assigned to execute a full-blown OS and configured to enter a deep sleep state during a power shortage condition. The full-blown OS may be Windows® or Linux operating system and may execute lifestyle applications. The RTOS may execute life safety applications. An internal memory may be shared between the first core and the second core. The internal memory may be configured to allow the first core and the second core to communicate with each other. A power management module, having a power management interface, may be controlled by the first core and may be in communication with the second core. The power management module may be configured to detect a power shortage condition.

DETAILED DESCRIPTION

Figure 1:
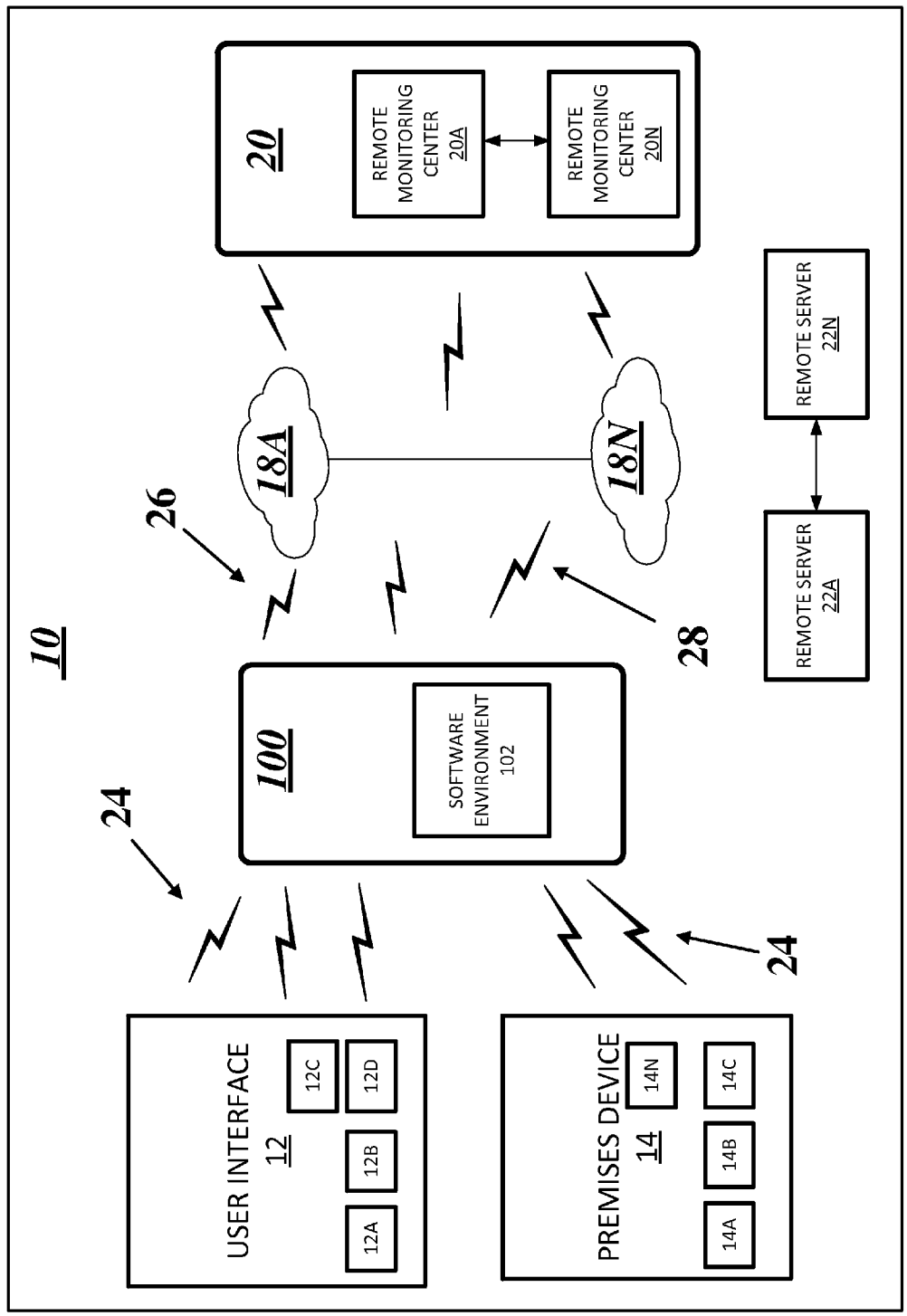
FIG. 1 is a schematic diagram illustrating an embodiment of a security and home automation system having segregated life safety and lifestyle applications.

Various embodiments of the present disclosure are directed to optimizing power management in a security and home automation system. A security and home automation system in accordance with the present disclosure may be a combination of a security system and a separate home automation system, or may be a single system having security and home automation features.

Home automation may refer to the use of computer and information technology to control home or business appliances and features, such as, for example, windows, doors, temperature, video, and lighting. A home automation system (or a home automation component of a security and home automation system) may include computer networks that connect various home automation devices to a central home automation control device, such as a computer or main controller component. A home automation system may also include lifestyle applications that automate and enhance a variety of conditions for improving lifestyle. For example, the central home automation control device may be programmed to turn on, turn off, or adjust the settings of the various home automation devices, such as lighting control, temperature control and/or remote viewing of video. A home automation system may range from simple remote control of lighting to complex computer/micro-controller based networks with varying degrees of intelligence and automation.

A home automation system may be integrated with a security system. A security system (or a security component of a security and home automation system) may be a life safety system that monitors and detects a variety of life safety events, such as, for example, threats, intruder entries, smoke/fire, life safety alerts, toxic or harmful gas detection, and/or alarms. These various types of life safety applications may be included in the security and home automation system. Use of a life safety application allows for users to protect both persons and property from various hazards and threats. Life safety applications allow users to control various devices (such as thermostats, switches, cameras, appliances, etc.).

An exemplary life safety application may report detected life safety events to a monitoring station. A life safety application may be limited to controlling and monitoring life safety features, such as intrusion and fire detection. For example, a life safety application may provide protection such that when a fire or burglar alarm is raised, a controller may turn on lights, sound audible alarms, and/or contact emergency services. Additionally, in conjunction with a home automation system, entertainment equipment such as audio, video, and home theatre equipment may be in communication with the security system to enable a remote device to activate the equipment according to programmed schedules or remote commands.

Various embodiments of the present disclosure are directed to a system and method having a first core partitioned from a second core in a multi-core processor for optimizing power consumption in a security and home automation system. The first core may be partitioned from the second core to form an asymmetric multi-core processor. As used herein, "Asymmetric" or "Asymmetric multiprocessor (AMP)" means all central processing units (CPUs) are not treated equally. For example, a security and home automation system may only allow (either at the hardware level or operating system level) one CPU to execute operating system code or may only allow one CPU to perform input/output (I/O) operations.

In one embodiment, the first core may be a master core assigned to execute a real time operating system (RTOS) and configured to periodically transition between a partial sleep state and an awake state during a power shortage condition. The RTOS may execute life safety applications. The second core may be a slave core assigned to execute a full-blown operating system (OS) and configured to enter a deep sleep state during the power shortage condition. The full-blown OS may be Windows® or Linux and may execute lifestyle applications.

The master core may be configured to determine, through self-monitoring, when to periodically transition between the partial sleep state and the awake state during the power shortage condition. The master core may be configured to determine, through the power management module, when to issue a sleep request for the second core, send a request to the second core to enter the awake state or enter the deep sleep state, and/or determine if any pending tasks of the RTOS are to be performed prior to entering the partial sleep state for itself. The master core is in association with a level 1 (L1) cache and a level 2 (L2) cache. The master core may be configured to transfer and lock down data of the RTOS into the L1 cache and the L2 cache and/or transfer and lock down data of the RTOS into the L1 cache, the L2 cache, and an internal RAM for conserving power.

The second core may be configured to receive and acknowledge a request from the first core to enter the awake state or enter the deep sleep state, determine if any pending tasks of the full-blown OS are to be performed prior to entering the deep sleep state, and/or enter the awake state during the power shortage condition upon receipt of the request to enter the awake state.

A memory may be shared between the first core and the second core. The memory may be an internal memory of the multi-core processor. The internal memory may be configured to allow the first core and the second to communicate with each other. In one embodiment, the master core and the slave core are each configured to send data to the internal memory and issue an interrupt upon sending the data to the memory indicating the availability of data.

A power management module, having a power management interface, may be controlled by the first core and may be in communication with the second core. The power management module may be configured to detect a power shortage condition. The power management module may be configured and associated with a life safety application and configured to detect a power shortage condition. The power management module is configured to issue a sleep request and a wakeup request.

Other embodiments of the present disclosure are directed to a partitioned multi-core processor (e.g., an i.Mx6 quad core ARM Cortex-A9) having one core that is assigned to run mission critical application (e.g., a life safety application), such as a security application, while the other cores of the processor are assigned to run a full-blown operating system. During a power shortage condition, the multi-core processor may be running on a battery. The cores running the full-blown operating system may go into a deep sleep state while the core running the life safety applications periodically wakes up to accomplish all tasks and/or jobs of the life safety applications.

Various cores of the multi-core processor may share the internal memory of the multi-core processor. As such, the requirement for a separate memory, such as external memory, for operating the core running the mission critical applications is eliminated if the required memory size allows. Furthermore, to reduce the power consumption of the multi-core processor while running on battery power, the mission critical application data may be transferred and locked into L1 or L2 caches, and the external main memory (e.g., a dynamic random-access memory (DRAM)) may be switched into a low power mode. Moreover, the communication speed between the cores in the multi-core processor is increased (the cores being in the same physical processor package), thereby allowing the battery charge to last a significantly greater amount of time as compared to the case where there are two (2) processors in separate, physical processor packages. By using a multi-core processor partitioned into a first core and a second core to form an asymmetric multi-core processor during a power shortage condition, a significant improvement is achieved which optimizes power consumption for executing both life safety applications and lifestyle applications.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments set forth herein may be practiced without these specific details. In other instances, well-known structures and devices are shown in block diagram form in order to facilitate a description thereof. The intention is to cover various modifications, equivalents, and alternatives consistent with the first core and a second core subject matter.

FIG. 1 illustrates an embodiment of a security and home automation system having segregated life safety and lifestyle applications. Although the security and home automation system 10 shown in FIG. 1 has a limited number of elements in a certain topology, it may be appreciated that the security and home automation system 10 may include more or less elements in alternate topologies as desired for a given implementation.

It is worthy to note that "a" and "b" and "c" and similar designators used herein are intended to be variables representing any positive integer. Thus, for example, if an implementation sets a value for a=5, then a complete set of components 12-a may include components 12-1, 12-2, 12-3, 12-4 and 12-5. The embodiments are not limited in this context.

As shown in FIG. 1 a security and home automation control system constructed in accordance with the principles of the present disclosure are designated generally as "10." System 10 may include one or more user interface devices 12a to 12n (collectively referred to as "user interface device 12"), one or more premises devices 14a to 14n (collectively referred to as "premises device 14"), a multi-core processor 100, one or more networks 18a to 18n (collectively referred to as "network 18"), one or more remote monitoring centers 20a to 20n (collectively referred to as "remote monitoring center 20") and one or more remote servers 22a to 22n (collectively referred to as "remote server 22"), communicating with each other.

User interface device 12 may be a wireless device that allows a user to communicate with the multi-core processor 100. User interface device 12 may be a portable control keypad/interface 12a, computer 12b, mobile phone 12c or tablet 12n, among other devices that allow a user to interface with the multi-core processor 100. User interface device 12 may communicate at least with the multi-core processor 100 using one or more wireless communication protocols well known to those of ordinary skill in the art. For example, portable control keypad 12a may communicate with the multi-core processor 100 via a ZigBee based communication link 24, e.g., network based on Institute of Electrical and Electronics Engineers (IEEE) 802.15.4 protocols, and/or Z-wave based communication link 24, or over the premises' local area network, e.g., network based on Institute of Electrical and Electronics Engineers (IEEE) 802.11 protocols. Other communication protocols may be used and may be directional or bi-directional and proprietary and not per any published standard. The present disclosure is not limited in this regard.

Premises devices 14 may include one or more types of sensors, control and/or image capture devices. For example, the types of sensors may include various life safety related sensors such as motion sensors, fire sensors, harmful and/or toxic gas sensors, flooding sensors and contact sensors, among other sensor types that are known in the art. Exemplary control devices may include, for example, one or more lifestyle related devices configured to adjust at least one premises setting such as lighting, temperature, energy usage, door lock, and power settings, among other settings associated with the premises or devices on the premises. Exemplary image capture devices may include a digital camera and/or video camera, among other image captures devices that are well known in the art. Premises devices 14 may communicate with multi-core processor 100 via proprietary wireless communication protocols and may also use communication link 24, which may be Wi-Fi. Those of ordinary skill in the art will also appreciate that various additional sensors and control and/or image capture devices may relate to life safety or lifestyle depending both on what the sensors, control and image capture devices do and how these sensors, control and image devices are used by system 10. One of the advantages of the present disclosure is the ability to use any of these devices irrespective of whether they relate to life safety or lifestyle.

A multi-core processor 100 may provide management functions such as power management, premises device management, life safety or lifestyle management, and alarm management, among other functions. In particular, multi-core processor 100 is configured such that it utilizes a software architecture in a software environment 102 having separate lifestyle and life safety software code/applications. The lifestyle software running on multi-core processor 100 does not impact life safety software code also running on multi-core processor 100. The multi-core processor 100 may include software environment 102, as described in detail with respect to FIGS. 2-8.

The multi-core processor 100 may manage one or more life safety applications and/or lifestyle applications having various features using this software architecture 102. Life safety features may correspond, for example, to security system functions and settings associated with premises conditions that may result in life threatening harm to a person, such as detecting a perimeter intrusion, carbon monoxide detection and/or intrusion detection. Lifestyle features may correspond, for example, to non-security system functions and settings associated with non-life threatening conditions, events, and/or conditions of the premises, such as lighting and thermostat functions. Exemplary multi-core processor 100 components and functions are illustrated in detail in FIGS. 2-7.

The multi-core processor 100 may communicate with network 18 via one or more communication links. In particular, the communications links may be broadband communication links such as a wired cable modem or Ethernet communication link 26, digital cellular communication link 28, such as long-term evolution (LTE) based link, and/or communication link 24 as described above. Broadband as used herein may refer to a communication link such as a wired and/or wireless communication link including Wi-Fi and other technologies. Ethernet communication link 26 may be an IEEE 802.3 based communication link. Network 18 may be a wide area network, local area network, wireless local network or metropolitan area network, among other networks known in the art. Network 18 provides communications between multi-core processor 100, remote monitoring center 20 and remote server 22, among other servers and devices.

The system 10 may include remote monitoring center 20 that is capable of performing certain monitoring and configuration, and/or executing control functions associated with the multi-core processor 100. For example, remote monitoring center 20 may include a remote life safety-monitoring center that monitors life safety features associated with the multi-core processor 100 in which the remote monitoring center 20 receives life safety data from the multi-core processor 100. For example, life safety data may include readings detected by a variety of sensors and/or detectors, such as carbon monoxide detection readings, and/or smoke detection readings. In yet another example, life safety data may include at least one of sensor location and time of detection, among other data related to a detection that may be communicated with remote monitoring center 20.

In one embodiment, life safety data may include alarm event data. For example, the alarm event data may be used by the remote monitoring center 20 in running through various life safety response processes in notifying the owner of the premises, determining whether an actual alarm event is occurring at the premises, and/or notifying any appropriate response agencies, such as, for example, police, fire, emergency response, other interested parties such as premises owners.

The same or separate remote monitoring center 20 may also include a remote lifestyle or life safety service allowing for various lifestyle and life safety features associated with the multi-core processor 100. The remote lifestyle service may receive lifestyle data from the multi-core processor 100. For example, with respect to temperature control, lifestyle data may include thermostat readings. In yet another example, with respect to video capture devices, lifestyle and/or life safety data may include at least one of captured images, video, time of video capture and video location, among other data related to video capture devices that may communicate with remote monitoring center 20. Remote monitoring center 20 may also provide updates to the multi-core processor 100 such as updates to features associated with life safety and/or lifestyle applications using one or more operating systems. Those of ordinary skill in the art will appreciate that video and other data may also be used by the remote monitoring center 20. System 10 may include remote server 22 and a database that stores system data, such as alarm events, system configuration, etc. Remote server 22 may provide updates to the multi-core processor 100.

Figure 2:
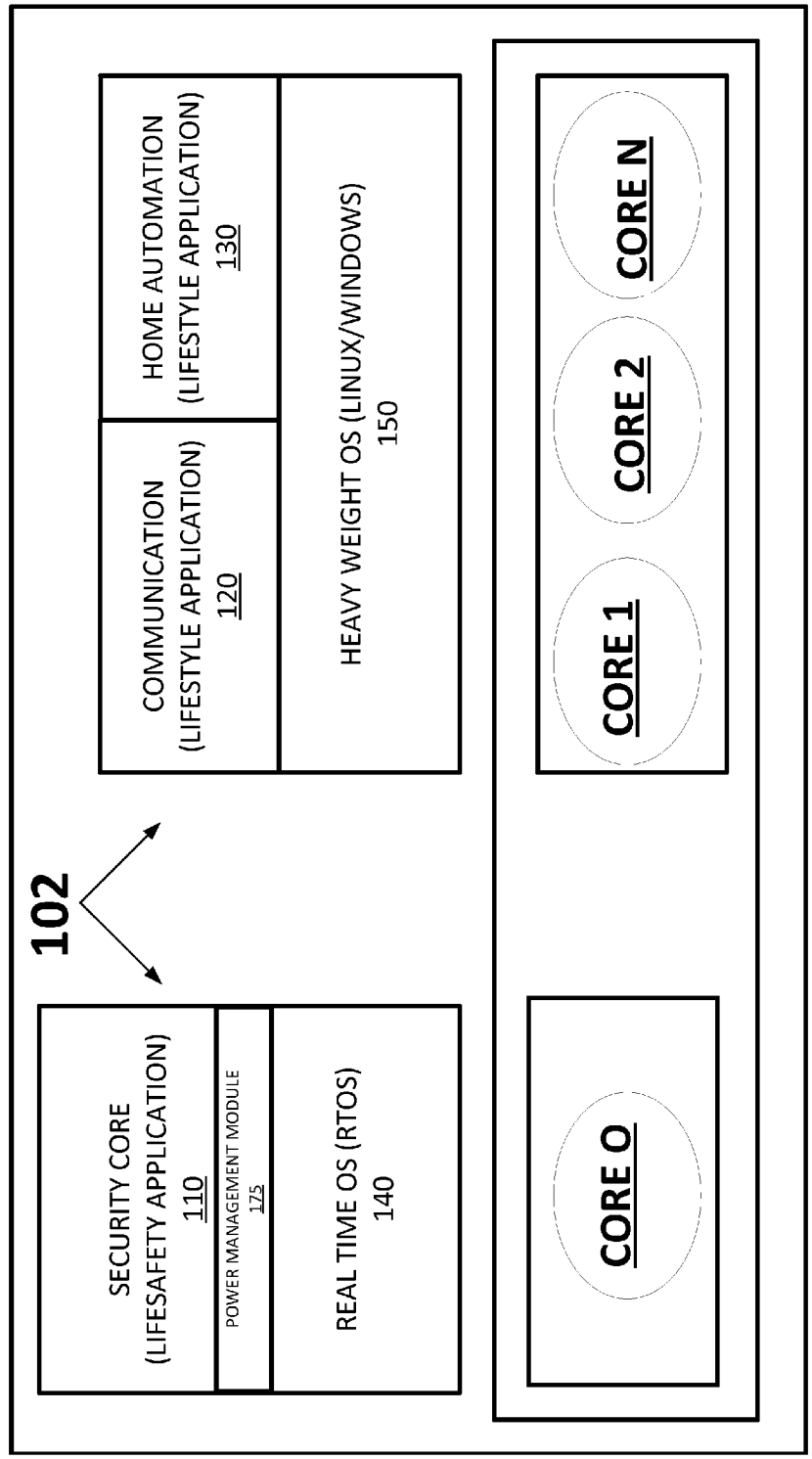
FIG. 2 is a schematic diagram illustrating an embodiment of a multi-core processor partitioned into an asymmetric structure in a security and home automation system of FIG. 1.

FIG. 2 illustrates an embodiment of a multi-core processor 100 partitioned into an asymmetric structure in a security and home automation system 10. The multi-core processor 100 includes Core 0 partitioned from core 1, core 2, and core n to form an asymmetric multi-core processor. The partition may be a logical partition. From a hardware point of view, the system 10 is running the same multi-core processor 100. In one embodiment, the partition is a physical partition.

The multi-core processor 100 may have 4, 8, 16 or more processing cores. However, the cores of the multi-core processor 100 are partitioned to separate one or more cores for running the life safety application 110 (e.g., the security core) and the power management module 175 on the RTOS 140, with the other cores configured to run the lifestyle applications, 120, 130, such as communication application 120 and home automation applications 130 on a full-blown OS 150. In particular, the multi-core processor 100 may utilize a software architecture that separates the lifestyle applications, 120, 130, such as communication application 120 and home automation applications 130, from the life safety application 110. The lifestyle applications, 120, 130, such as communication application 120 and home automation applications 130, running on the multi-core processor 100 do not impact the life safety application 110 and the power management module 175 also running on the multi-core processor 100. It should be noted that communication application 120 and home automation application 130 are both lifestyle applications and may be collectively referred to as "lifestyle applications, 120, 130."

The multi-core processor 100 may run application codes shown with the different partitions, such as one or more cores being partitioned from one or more alternative cores. The multi-core processor 100 may run application codes in an asymmetrical multi-processing (AMP) mode, with one or more cores executing a full-blown OS, such as Linux® OS or Windows® OS, which is a "heavy weight OS." As used herein, "heavy weight" and "light weight" are used to define process types, wherein "heavy weight OS" and "lightweight OS" are used to describe the operating system as full-blown or not full-blown. As such, the term "heavy weight OS" may be referred to as full-blown OS while the term "lightweight OS" may be referred to as ail operating system that is not a full-blown OS.

The partitioned, alternative cores may execute a real time operating system (RTOS) (e.g., a lightweight OS). More specifically, Core 0 may be assigned to execute a RTOS 140 and configured to periodically transition between a partial sleep state and an awake state during a power shortage condition. Cores 1-n may be assigned to execute a full-blown operating system 150, such as Linux and/or Windows, and are configured to enter a deep sleep state during a power shortage condition. The software environment 102 includes both the RTOS 140 and the full-blown operating system 150. The RTOS 140 is an operating system intended to serve real-time application requests, such as a security core/life safety application 110 that is able to process data as it comes into the system 10 without buffering delays. The processing time of the data or tasks in the RTOS 140 is measured in tenths of a second or shorter.

The life safety application 110 includes, but is not limited to, applications for protecting or maintaining the health, safety, and/or welfare of persons or property, such as by monitoring against intrusions, detecting hazardous conditions, or monitoring other real time events. The life safety application 110 includes a security core and power management module 175 for optimizing security protection and/or optimizing power consumption during a power shortage.

In one embodiment, during a power shortage, the lifestyle applications 120, 130 operate independently of the life safety application 110, and execute and perform each type of lifestyle application process. The lifestyle applications 120, 130 include, but are not limited to, applications for controlling temperature, lighting, electronics, and/or other applications related to increasing and enhancing lifestyle and conveniences, along with automating events, such as automatically turning lights on/off.

Figure 3:
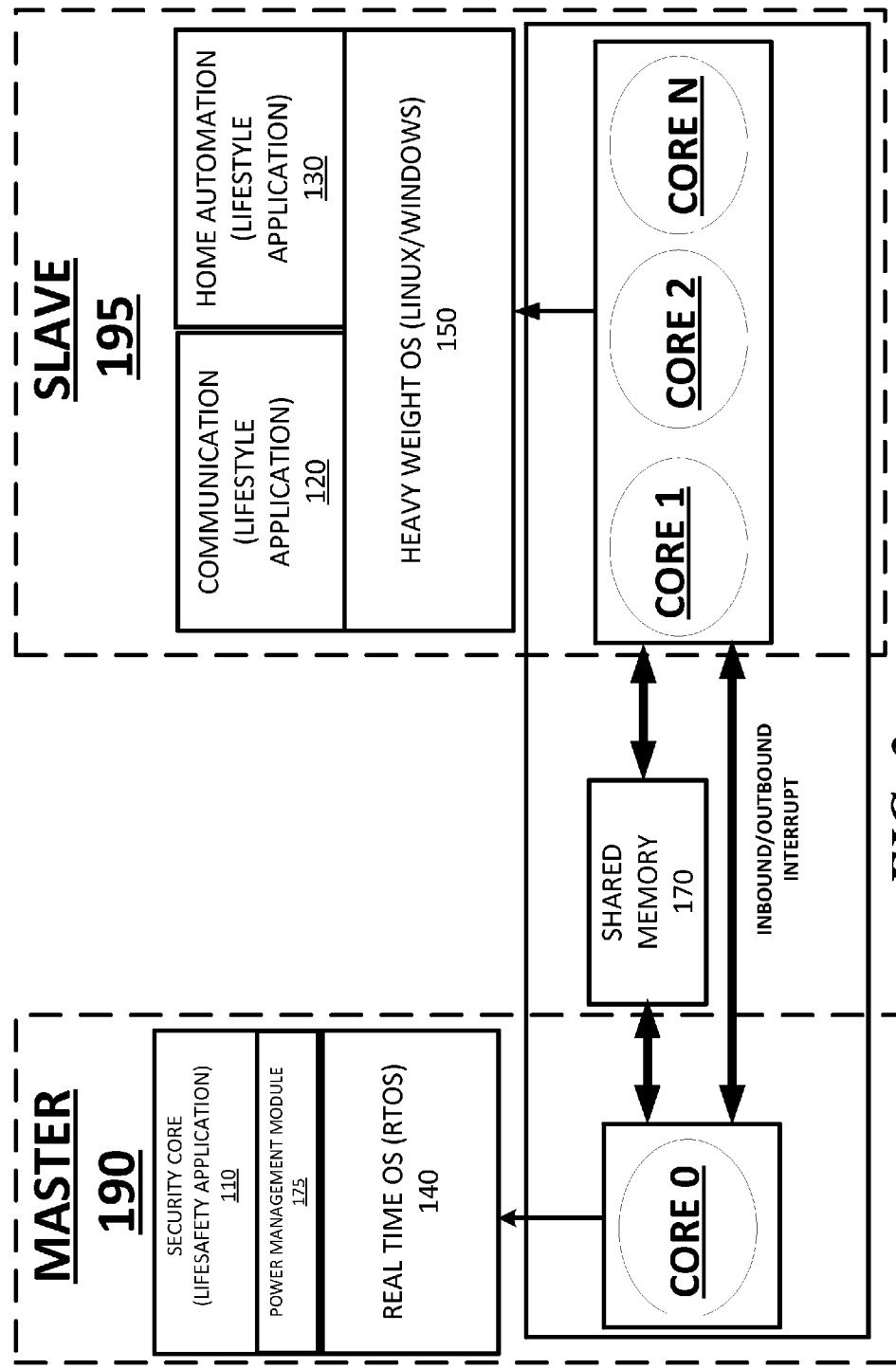
FIG. 3 is a schematic diagram illustrating an embodiment for communication with a multi-core processor during a power shortage condition in the security and home automation system of FIG. 2.

FIG. 3 illustrates an embodiment for communication in a multi-core processor during a power shortage condition in a security and home automation system of FIG. 2. FIG. 3 depicts in greater detail the partitioning of the Cores of the multi-core processor 100. The partition includes Core 0 designated as a master core 190 and partitioned from Cores 1-n, which are designated as slave cores 195 (collectively referred to as "slave core 195"). The slave core 195 may include one or more cores, such as Cores 1-*n*, and/or various sets of Cores 1-*n*. The master core 190, such as core 0, is partitioned from the slave core 195 to form an asymmetric multi-core processor. In one embodiment, the partition is a logical partition. In another embodiment, the partition is a physical partition. The slave core 195 is assigned to execute a standard, full-blown operating system (OS) 150 and is configured to enter a deep sleep state during the power shortage condition.

In one embodiment, the deep sleep state is a sleep state exceeding a time period greater than or equal to a minute, such as 10 minutes, an hour, and/or a day or longer. The slave cores, including core 1, core 2, and core n, for example, may be configured for entering the deep sleep state and may only exit the deep sleep state upon either 1) a time out and/or 2) a wake up request in order to exit the deep sleep state. The partial sleep state may be defined as a time period less than or equal to a minute, such as less than 1/10 of a second. In one embodiment, the time period for either the deep sleep state and/or the partial sleep state may be predefined. In one embodiment, the deep sleep state time period is always greater than the partial sleep time period.

The master core 190 is configured to enter the partial sleep state and periodically transition between the partial sleep state and the awake state for executing tasks and jobs of the RTOS 140. The RTOS 140 executes the life safety applications 110 and/or a power management module 175. The slave core 195 is configured to enter the deep sleep state and periodically transition between the deep sleep state and the awake state upon either the time out or a wake up request in order to exit the deep sleep state for executing tasks and jobs of the full-blown operating system 150. The full-blown operating system 150 running on the slave core 195 executes the lifestyle applications 120, 130, such as the communication application 120 and the home automation application 130.

Figure 4:
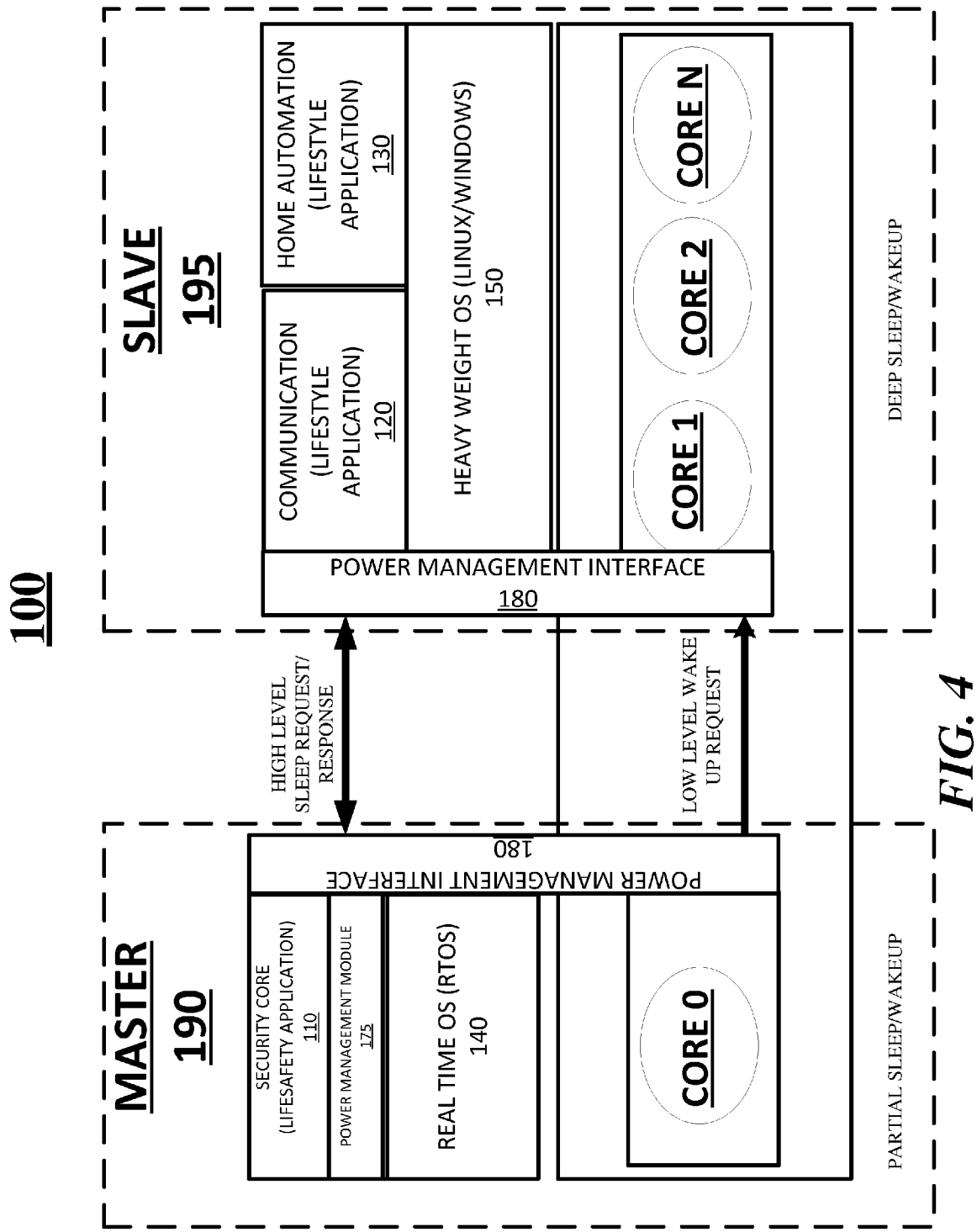
FIG. 4 is a schematic diagram illustrating an embodiment of a power management module in a multi-core processor during a power shortage condition in the security and home automation system of FIG. 2.

The power management module 175, which may be part of the life safety application 110, may include a power management interface (see 180 in FIG. 4). The power management module 175 of the life safety application 110 may be controlled by the master core 190 and is in communication with the slave core 195. The power management module 175 of the life safety application 110 is configured to detect a power shortage condition and/or issue a sleep request and a wakeup request. For example, during a power blackout or some other type of power shortage condition, the multi-core processor 100 may run on battery power. Since the full-blown operating system 150 consumes a greater amount of power as compared to the power consumption of the RTOS 140, the slave core(s) 195 is configured to enter the deep sleep state, while the master core 190 periodically transitions between the partial sleep state and the awake state.

A memory 170, such as an internal memory in the multi-core processor 100, is shared between the master core 190 and the slave core(s) 195. The memory 170 is configured so as to allow the master core 190 and the slave core 195 to communicate with each other. Information and data may need to be shared or distributed to the master core 190 and/or the slave core 195. Hence, communication occurs between the master core 190 and/or the slave core 195 by sending and placing data into the memory 170. In one embodiment, the data placed into the memory 170 is any data associated with the life safety application 110 and/or the lifestyle applications 120, 130. In one embodiment, the data placed into the memory 170 is any data placed into the memory 170 that needs to be communicated to or from systems, hardware, or devices in association with the multi-core processor 100 (e.g., the "outside world"), such as data needing to be sent to, or received from, a mobile phone device of a user of the system 10.

In one embodiment, placing data into the memory 170 by the master core 190 triggers an interrupt to one or more cores of the slave core 195. For example, if the master core 190 sends data to the shared memory 170, an interrupt is triggered and sent to the slave core 195. Once the slave core 195 receives the interrupt, the slave core 195 retrieves the data from the memory 170, and the slave core 195 issues an acknowledgment for receipt of the data.

It should be noted that the interrupt also functions as a wake up request. In one embodiment, the interrupt may be a mechanism for sending the data and/or acknowledging the reception of the data between the master core 190 and the slave 195. In an additional embodiment, an acknowledgment is provided to either the master core 190 or the slave core 195 when data is received from either the life safety application 110 and/or the lifestyle applications 120, 130. Upon receipt of the acknowledgment, the data is retrieved from the shared memory 170.

For example, assume the master core 190 has transitioned from the partial deep sleep into the awake state and receives and processes an intruder alert received by the life safety application 110 during the power shortage. The master core 190 places instructions into the memory 170 for the life style applications 120, 130 to execute an automated control feature, such as turning on all exterior and/or interior lighting. An interrupt is sent from the master core 190 to the slave core 195. The interrupt functions as a wake up request and triggers the slave core 195 to exit the deep sleep state. An acknowledgement of the data is sent by the slave core 195 to the master core and retrieves the instructions. The instructions are processed by the life style applications 120, 130.

FIG. 4 illustrates an embodiment of a power management module 175 in a multi-core processor during a power shortage condition in a security and home automation system of FIG. 2. The power management module 175 of the life safety application 110 may provide management functions such as power management, premises device management, and/or alarm management, among other functions. The power management module 175 of the life safety application 110 may include a power management interface 180. The power management interface 180 is in communication with the master core 190 and the slave core 195. The power management module 175 of the life safety application 110 is configured to detect a power shortage condition and issue a sleep request and a wakeup request.

As illustrated in FIG. 4, the life safety applications 110 are running critical applications for life safety, such as alarms or sensors. As such, the master core 190 periodically transitions between a partial sleep state and an awake state during a power shortage condition. For example, the master core 190 may transition between the partial sleep state into the awake state every one millisecond and/or every ten milliseconds, for example. During the awake state, the master core 190 executes all required tasks and/or jobs and returns to the partial sleep state.

On the other hand, the slave core 195 is configured to enter a deep sleep state rather than the partial sleep state during the power shortage condition. For example, the slave core 195 may go into the deep sleep state for over an hour prior to receiving a trigger to leave the deep sleep state and transition to the awake state. During the deep sleep state of the slave core 195, all activities of the slave core 195 are frozen. For example, any cache of the slave core 195 remains the same at the time of the power shortage.

In one embodiment, the memory 170 may be an internal memory of a multi-core processor 100, such as an internal random-access memory (RAM). In one embodiment, an external memory of the multi-core processor 100, such as a dynamic random-access memory (DRAM) (not shown), may be associated with either the slave core 195 and/or the master core 190.

In one embodiment, the memory 170 may be an internal RAM and is configured to remain in the awake state. Hence, the memory 170 remains in the awake state when the slave core 195 enters the deep sleep state. In an alternative embodiment, the memory 170 is in an external DRAM and may not enter into the sleep state.

In one embodiment, the power management module 175 of the life safety application 110 controls when the slave core 195 enters the deep sleep request. As such, a "high-level" sleep request may be sent from the power management module 175 of the life safety application 110 to the lifestyle applications 120, 130. (High level referring to the sleep request sent directly from the life safety application 110 to the lifestyle applications, 120, 130 via the power management interface 180). This is in response to determining that there are no pending tasks, jobs, or operations that need to be executed and/or performed by the slave core 195. If there are no pending tasks, jobs, or operations that need to be executed and/or performed by master core 190, the master core 190 may enter the partial sleep state without any "request" since the security core is located on RTOS 140 controlled by the master core 190.

In one embodiment, the slave core 195 may either enter the deep sleep state upon either one of 1) a time out following the expiration of a predetermined time and/or 2) receiving a sleep request. Upon receiving the sleep request from the power management module 175 of the life safety application 110, the lifestyle applications 120, 130 respond to the power management module 175 of the life safety application 110 with a "high-level" sleep response indicating the slave core 195 is entering the deep sleep state.

In one embodiment, the slave core 195 may enter the awake state upon either one of 1) a time out following the expiration of a predetermined time and/or 2) receiving a wake up request, such as an interrupt. The wake up request is a "low level" wake up request. The low-level request is sent directly from the master core 190 to the slave core 195 via the memory 170. ("Low level" referring to the wake up request (e.g., the interrupt) sent "core-to-core," such as when the master core 190 directly sends the wake up request/interrupt to the slave core 195). In one embodiment, the master core 190 self-governs for determining when to enter and exit the partial sleep state.

Figure 5:
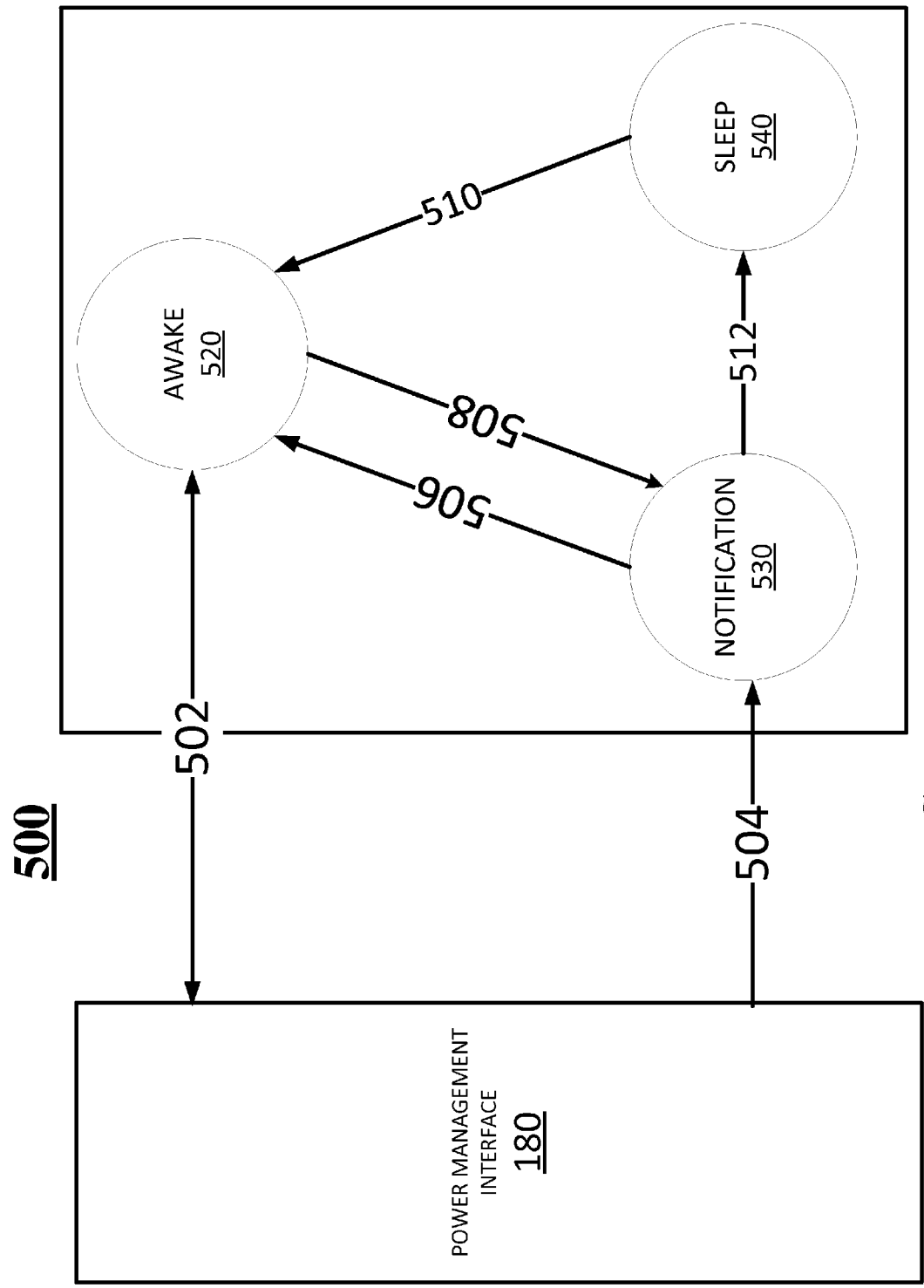
FIG. 5 illustrates an embodiment of a state diagram in a multi-core processor during a power shortage condition in the security and home automation system of FIG. 2.

FIG. 5 illustrates an embodiment of a state diagram 500 in a multi-core processor during a power shortage condition of FIGS. 2-4. As illustrated in FIG. 5, the power management interface 180 may issue either the low level wake up request 504 and/or the high level sleep request or sleep response 502. Using the state diagram 500 of FIG. 5, the low level wake up request 504 and/or the high level sleep request or sleep response 502 may be independently issued. For illustration purposes, it will be assumed that the slave core 195 is in the awake state. The slave core 195 may transition from the awake state to the deep sleep state in response to 1) the high level sleep request 502, and/or 2) a time out. The slave core 195 may set a timer to a predetermined time period for transitioning between the deep sleep and the awake state. For illustration purposes only, it will be assumed in FIG. 5 that a high level sleep request 502 is issued from the life safety application 110. The slave core 195 receives the high level sleep request 502 and transitions to the notification state 530. During the notification state 530, the slave core 195 checks or determines if there are any tasks the lifestyle applications 120, 130 need to process, execute, and/or perform. If so, the slave core 195 processes, executes, and/or performs any pending tasks or jobs. Any locks or mechanisms preventing the slave core 195 from going into the deep sleep state are released and/or cleared. From the notification state 530, the slave core may transition 512 into the deep sleep state 540 after clearing any tasks and/or releasing any locks.

At this point, the slave core 195 may be in the deep sleep state 540. In order to wake up and transition out of the deep sleep state 540, either the low level wake up request 504 is issued from the master core 190 to the slave core 195 and/or a time out occurs. It will be assumed, for illustration purposes, that the low level wake up request 504 is sent from the master core 190 via the power management module 175 to the slave core, such as core 1. The low level wake up request 504 may be triggered based on the master core 190 placing data into the shared memory 170. Upon receiving the low level wake up request 504, the slave core 195 transitions from the deep sleep state 540 to the awake state 520. A notification state 530 is also entered into by sending an acknowledgment 506 of receiving the wake up request upon receiving the low level wake up request 504. This notification/acknowledgment 506 of receiving the wake up request is supplied back to the master core 190 via the power management interface 180. Also, as part of the notification state 530, the slave core 195 checks or determines if there are any tasks the lifestyle applications 120, 130 need to process, execute, and/or perform. The slave core 195 processes, executes, and/or performs any pending tasks or jobs of the lifestyle applications, 120, 130. More specifically, the slave core 195 processes or retrieves the data from the shared memory 170, which may be placed therein by the master core 190, and processes such data. Such data is processed using the full-blown operating system 150 for the lifestyle applications 120, 130. After completing all tasks or jobs of the lifestyle applications, 120, 130, the slave core 195 may issue a notification 508 that the slave core is requesting a sleep request and/or is timing out. The slave core 195 issues a notification 502 that the slave core is requesting a sleep permission (e.g., a request for permission to sleep) to the power management interface 180.

Each step in the state diagram may repeat and transition according to the various states of the partitioned, multi-core processor 100.

Figure 6:
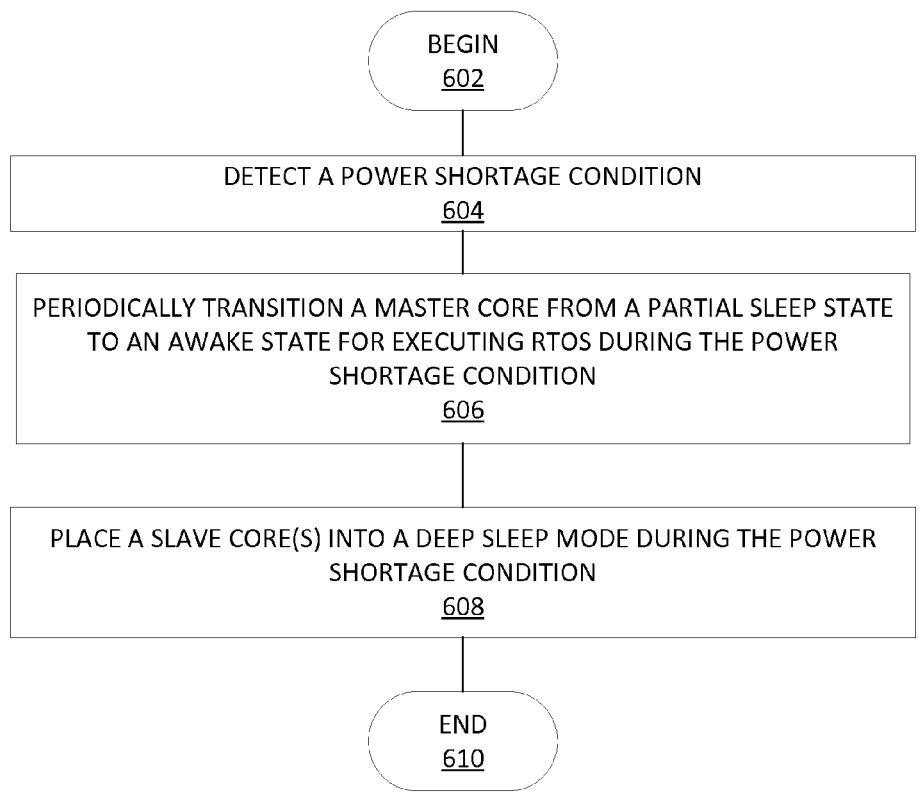
FIG. 6 is a logic flow diagram illustrating an exemplary method for executing the power management module in a multi-core processor during a power shortage condition in the security and home automation system of FIG. 2.

FIG. 6 illustrates an embodiment of a detailed logic flow for executing the power management module 175 in a multi-core processor 100 during a power shortage condition in the security and home automation system 10 shown in FIGS. 1-2. In the illustrated embodiment shown in FIG. 6, the logic flow 600 may begin at block 602. The logic flow 600 then proceeds to block 604. At block 604, a power shortage condition is detected. The multi-core processor 100 operates on batter power during the power shortage condition. A master core 190 may periodically transition from a partial sleep state to an awake state for executing the RTOS 140 during the power shortage condition at block 606. The logic flow 600 moves to block 608. One or more slave core 195 may be placed into a deep sleep state during the power shortage condition at block 608. Following block 608, the logic flow may end at block 610.

Figure 7:
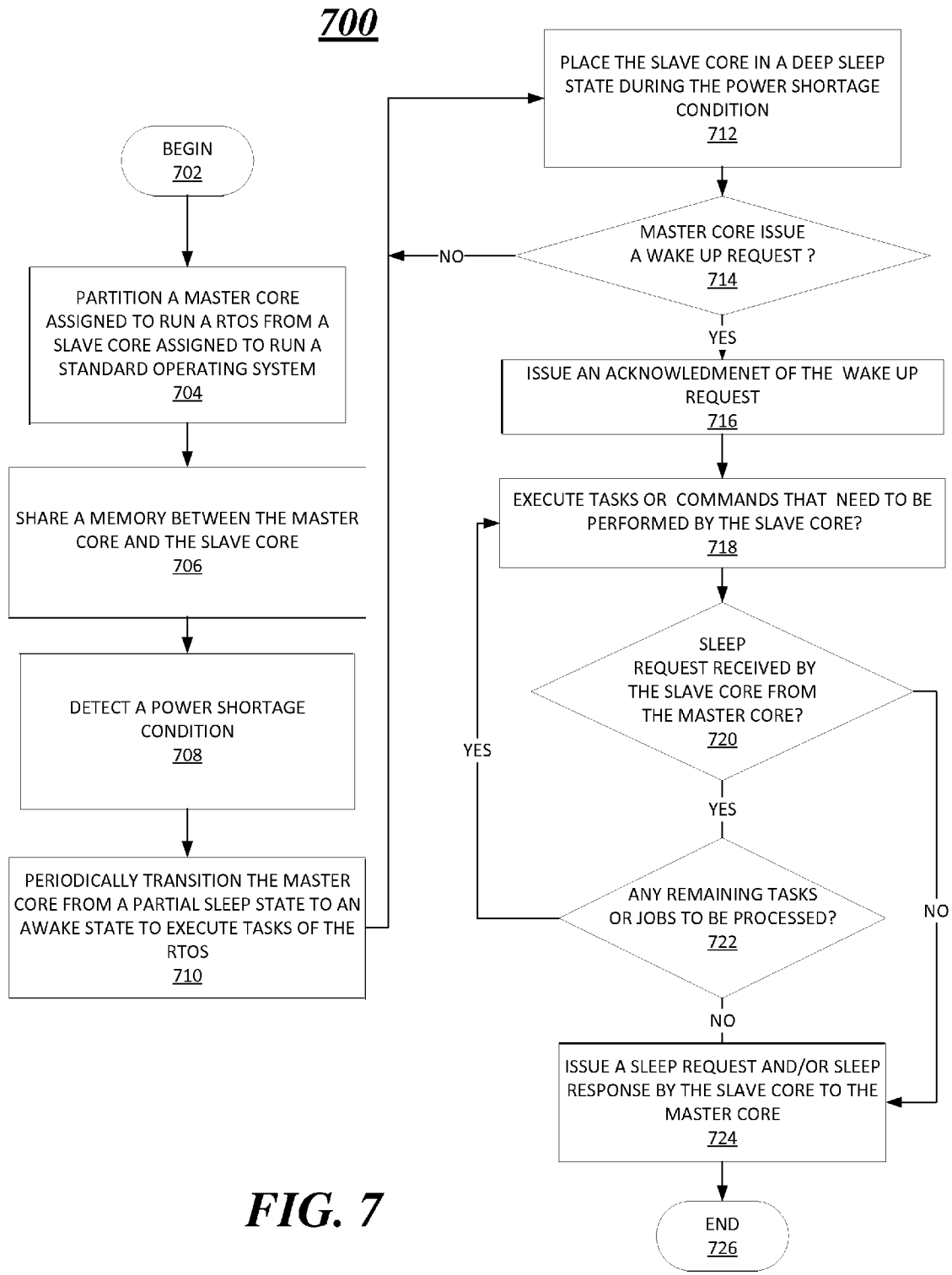
FIG. 7 is a logic flow diagram illustrating an exemplary method for executing the power management module for communication between a master core and slave core during a power shortage condition in the security and home automation system of FIG. 2.

FIG. 7 illustrates an embodiment of a detailed logic flow 700 for executing the power management module 175 for communication between the master core 190 and the slave core 195 during a power shortage condition in the security and security and home automation system 10 of FIG. 2. In the illustrated embodiment shown in FIG. 7, the logic flow 700 may begin at block 702. The logic flow 700 then proceeds to block 704. A master core 190, which is assigned to run the RTOS 140, may be partitioned from a slave core assigned to run a full-blown operating system, such as Windows or Linux, at block 704. Memory 170 may be shared between the master core 190 and the slave core 195 at block 706. The memory 170 may be the internal memory of the multi-core processor 100. In one embodiment, external memory (not shown), such as the DRAM, is associated with the slave core 195 and/or the master core 190. A power shortage condition may be detected at block 708. The multi-core processor 100 operates on battery power during the power shortage condition.

A master core 190 may periodically transition from a partial sleep state to an awake state for executing tasks or jobs of the RTOS during the power shortage condition at block 710. The logic flow 700 moves to block 712. The slave core 195 may be placed into a deep sleep state during the power shortage condition at block 712. It should be noted that the slave core 195 may be associated with a timer. The timer may be set to a predetermined time period for transitioning from the deep sleep state to the awake state and/or transitioning from the awake state to the deep sleep state upon occurrence of a time out. The master core 190 may control, set, and/or override the predetermined timer as needed. Following block 712, a determination is made to check if the master core 190 issues a wake up request at block 714. In one embodiment, the wake up request is an interrupt trigged upon the master core 190 placing data to be executed by the slave core 195 into the shared memory 170. If no, the logic flow 700 returns to block 712 and the slave core 195 remains in the deep sleep state until a request by the master core 190 is received and/or upon expiration of a time out. If yes, the logic flow moves to block 716.

An acknowledgment is issued by the slave core 195 and sent to the master core 190 for indicating a receipt of the wake up request at block 716. The slave core 195 may process any data and/or executes any tasks or commands by the full-blown operating system 150 for the lifestyle applications 120, 130 at block 718. If data was placed into the shared memory 170 by the master core 190 for the slave core 195, as part of block 718, the slave core 195 may retrieve this data from the shared memory 170 and may processes the data. The power management module 175 determines if a sleep request is sent from the master core 190 and received by the slave core 195 at block 720. If no, the logic flow 700 moves to block 724. If yes, the logic flow 700 moves to block 722.

The power management module 175, on the master core 190, determines if there are any remaining tasks, commands, jobs, and/or data to be executed and/or processed at block 722. If yes, the logic flow 700 returns to step 718. If no, a sleep request is issued by the slave core 195 to the master core 190 for permission to go into the deep sleep state at block 744. The logic flow 700 ends at block 726.

Thus, as described herein, various embodiments of the present disclosure provide a system having a partitioned, multi-core processor for optimizing power consumption in a security and home automation system.

The present invention provides advantages over the current state of the art by using a multi-core processor for optimization of power consumption of home automations systems, such as an intrusion detection system, operating on batteries. For example, during a power shortage of high power consumption system running on a battery, the present disclosure provides the benefit of a multi-core processor having a first core partitioned from a second core to form an asymmetric multi-core processor. The first core and the second core are in a same physical package. The asymmetric multi-core processor allows the first core to be a master core assigned to execute a real time operating system (RTOS) and configured to periodically transition between a partial sleep state and an awake state during a power shortage condition. The asymmetric multi-core processor allows the second core to be a slave core assigned to execute a standard, full-blown operating system (OS) and configured to enter a deep sleep state during the power shortage condition. The asymmetric multi-core processor shares an internal memory between the first core and the second core. The internal memory is configured so as to allow the first core and the second to communicate with each other. In this way, the present disclosure reduces the power consumption of the asymmetric multi-core processor running on a battery as well as reducing product footprint and manufacturing costs.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A security and home automation system for optimizing power consumption, comprising:
a multi-core processor having a first core and a second core, the first core partitioned from the second core to form an asymmetric multi-core processor, wherein:
the first core is a master core assigned to execute a real time operating system (RTOS) and configured to periodically transition between a partial sleep state and an awake state during a power shortage condition, the first core configured to determine through self-monitoring when to periodically transition between the partial sleep state and the awake state during the power shortage condition, and
the second core is a slave core assigned to execute a full-blown operating system (OS) and configured to enter a deep sleep state during the power shortage condition.

2. The security and home automation system of claim 1, further comprising a memory shared between the first core and the second core, the memory configured to allow the first core and the second core to communicate with each other, the first core and the second core each configured to send data to the memory and issue an interrupt upon sending the data to the memory indicating an availability of the data, wherein the memory is an internal memory of the multi-core processor.

3. The security and home automation system of claim 1, further comprising a power management module having a power management interface in communication with the first core and the second core, the power management module configured to detect the power shortage condition.

4. The security and home automation system of claim 3, the power management module configured to issue a sleep request and a wakeup request.

5. The security and home automation system of claim 1, the first core configured to:
determine, through a power management module, when to issue a sleep request for the second core;
send a request to the second core to enter one of the awake state and the deep sleep state; and
determine if any pending tasks of the RTOS are to be performed prior to entering the partial sleep state.

6. The security and home automation system of claim 1, the second core configured to:
receive and acknowledge a request from the first core to enter one of the awake state and the deep sleep state;
determine if any pending tasks of the full-blown OS are to be performed prior to entering the deep sleep state; and
enter the awake state during the power shortage condition upon receipt of the request to enter the awake state.

7. The security and home automation system of claim 1, further comprising a level 1 (L1) cache, a level 2 (L2) cache and an internal random access memory (RAM), the first core configured to transfer and lock data of the RTOS into the L1 cache, the L2 cache, and the internal RAM.

8. The security and home automation system of claim 1, wherein the full-blown OS is one of a Windows or Linux operating system, and wherein the full-blown OS executes a plurality of lifestyle applications and the RTOS executes a plurality of life safety applications.

9. A computer-implemented method for optimizing power consumption in an intrusion detection and home automation system using a processor device, comprising:
partitioning a first core from a second core in a multi-core processor to form an asymmetric multi-core processor, wherein the first core is a master core executing a real time operating system (RTOS) and the second core is slave core executing a full-blown operating system (OS);
periodically transitioning the first core between a partial sleep state and an awake state during a power shortage condition, wherein the first core determines through self-monitoring when to periodically transition between the partial sleep state and the awake state during the power shortage condition; and
placing the second core in a deep sleep state during the power shortage condition.

10. The method of claim 9, further comprising:
sharing a memory between the first core and the second core for allowing the first core and the second core to communicate with each other;
issuing an interrupt upon sending data to the memory by the first core indicating availability of data; and
triggering a wakeup request for the second core using the interrupt.

11. The method of claim 9, further comprising detecting the power shortage condition by a power management module having a power management interface in communication with the first core and the second core.

12. The method of claim 11, further comprising issuing one of a sleep request and a wakeup request by the power management module.

13. The method of claim 9, further comprising:
determining by the first core when to issue a sleep request for the second core;
sending to the second core one of a wakeup request to enter the awake state and the sleep request to enter the deep sleep state; and
determining if any pending tasks are to be performed prior to entering one of the partial sleep state by the first core and entering the deep sleep state by the second core.

14. The method of claim 9, further comprising:
receiving from the first core and acknowledging by the second core one of a wakeup request to enter the awake state and a sleep request to enter the deep sleep state; and
entering the awake state by the second core during the power shortage condition upon receipt of the wakeup request.

15. The method of claim 9, further comprising transferring and locking data of the RTOS by the first core into a level 1 (L1) cache, a level 2 (L2) cache, and an internal random access memory (RAM).

16. The method of claim 9, further comprising executing a plurality of lifestyle applications by the full-blown OS and executing a plurality of life safety applications by the RTOS, wherein the full-blown OS is one of a Windows operating system and a Linux operating system.

17. A system for optimizing power consumption during a power shortage condition, comprising:
a multi-core processor having a first core partitioned from a second core;
an internal memory shared between the first core and the second core, the internal memory configured to allow the first core and the second core to communicate with each other; and
a power management module having a power management interface, the power management module controlled by the first core and in communication with the second core, the power management module configured to detect the power shortage condition and issue a sleep request and a wakeup request; wherein:

the first core is a master core assigned to execute a real time operating system (RTOS) and configured to periodically transition between a partial sleep state and an awake state, the first core configured to determine through self-monitoring when to periodically transition between the partial sleep state and the awake state during the power shortage condition; and the second core includes a plurality of slave cores assigned to execute a full-blown operating system (OS) and configured to enter a deep sleep state during the power shortage condition, wherein the full-blown OS is one of a Windows operating system and a Linux operating system, and the full-blown OS executes a plurality of lifestyle applications and the RTOS executes a plurality of life safety applications.

18. The system of claim 17, wherein the first core and the second core are each configured to send data to the internal memory, and the first core is configured to issue an interrupt upon sending the data to the internal memory indicating availability of data when the second core is in the deep sleep state.

19. The system of claim 17, wherein the first core is configured to:
determine when to issue the sleep request for the second core;
send to the second core one of the wakeup request to enter the awake state and the sleep request to enter the deep sleep state; and
determine if any pending tasks of the RTOS are to be performed prior to entering the partial sleep state.

20. The system of claim 17, further comprising a level 1 (L1) cache, a level 2 (L2) cache and an internal random access memory (RAM), the first core configured to transfer and lock data of the RTOS into the L1 cache, the L2 cache, and the internal RAM.

* * * * *